United States Patent [19]

Tiuraniemi et al.

[11] Patent Number: 5,418,787
[45] Date of Patent: May 23, 1995

[54] SIGNALLING METHOD FOR A RADIO SYSTEM

[75] Inventors: Riitta Tiuraniemi, Helsinki; Jorma Sarja, Lohja; Arto Harjula, Espoo, all of Finland

[73] Assignee: Nokia Telecommunications Oy, Espoo, Finland

[21] Appl. No.: 157,161

[22] PCT Filed: Apr. 1, 1993

[86] PCT No.: PCT/FI93/00141
§ 371 Date: Dec. 10, 1993
§ 102(e) Date: Dec. 10, 1993

[87] PCT Pub. No.: WO93/21697
PCT Pub. Date: Oct. 28, 1993

[30] Foreign Application Priority Data

Apr. 10, 1992 [FI] Finland ................................. 921602

[51] Int. Cl.6 ............................................. H04J 3/16
[52] U.S. Cl. ................................................ 370/95.1
[58] Field of Search ............... 370/95.1, 95.2, 95.3, 370/110.1, 85.7, 85.8; 455/33.1, 33.2, 33.3, 33.4; 340/825.08

[56] References Cited

U.S. PATENT DOCUMENTS

| 5,020,132 | 5/1991 | Nazarenk et al. ..................... 455/17 |
| 5,229,995 | 7/1993 | Strawczynski et al. ........... 370/95.3 |
| 5,239,545 | 8/1993 | Buchholz ........................... 370/95.1 |

FOREIGN PATENT DOCUMENTS 382035  8/1990  European Pat. Off. .

Primary Examiner—Douglas W. Olms
Assistant Examiner—Ajit Patel
Attorney, Agent, or Firm—Cushman, Darby & Cushman

[57] ABSTRACT

A signalling method for a radio system, including a plurality of base stations (BS1, BS2, BS3) and remote radio stations (MS1, MS2, MS3), in which a frequency channel serves as a time-shared control channel common to a plurality of base stations for transmitting messages. The base station (BS1, BS2, BS3), when having queuing messages, transmits the messages in the transmission time slot assigned to it on the time-shared control channel in the following order: a) the remaining messages of unfinished call set-up transactions initiated in the preceding transmission time slot, b) messages critical to the call set-up transaction and requiring an acknowledgement from the remote station, and c) messages requiring no acknowledgement from the remote station.

4 Claims, 1 Drawing Sheet

SIGNALLING METHOD FOR A RADIO SYSTEM

FIELD OF THE INVENTION

The invention relates to a signalling method for a radio system, comprising a plurality of fixed radio stations, and at least one remote radio station, the system comprising at least one frequency channel serving as a time-shared control channel common to a plurality of fixed radio stations for transmitting messages.

BACKGROUND OF THE INVENTION

In certain mobile radio systems, a plurality of fixed radio stations or base stations share a common radio channel called a time-shared control channel, and transmit sequentially on this channel. This type of system is used when there is a lack of radio channels, and the traffic density is low. In such mobile radio systems, each mobile radio responds only to the control signal burst transmitted on the time-shared control channel by the base station to which the mobile radio is currently registered, and signals back to the system (to the exchange) only via this particular base station during the reception of the control signal burst. However, if the control signal of the base station is no longer of sufficient level when received at the mobile radio, the mobile radio selects a new base station on the basis of the control signal levels received from the other base stations, and registers to the selected base station. In this type of system, the utilization of a time-shared control channel unavoidably leads to a situation where the time required to set up calls between the mobile radios and the network is statistically longer than in a system in which each base station has a dedicated control channel (which is not time-shared). This is because the base station may have more messages to be transmitted and received than what it is capable of handling during its transmission time slots on the time-shared control channel.

SUMMARY OF THE INVENTION

The object of the invention is to provide a signalling method which alleviates the above-mentioned problem in a radio system utilizing a time-shared control channel.

This is achieved by a signalling method for a radio system described in the foregoing Background section, which method according to the invention is characterized in that the fixed radio station having queuing messages transmits the messages in the transmission time slot of the fixed radio station on the time-shared control channel in the following order: a) the remaining messages of unfinished call set-up transactions initiated in the preceding transmission time slot of the fixed radio station, b) messages critical to the call set-up transaction and requiring an acknowledgement from the remote station, and c) messages requiring no acknowledgement from the remote station.

The basic idea of the invention is to select the priority of the signalling transactions effected during the transmission time slot of the fixed radio station on the time-shared control channel so that any unfinished call set-up transactions initiated in the previous transmission time slot are always completed first at the beginning of the transmission time slot. Data messages and announce messages associated with the channel management are transmitted at the end of the transmission time slot if the transmission time slot has not yet expired. The priority method according to the invention allows the call set-up time to be minimized within the limits of the assigned time slot even at high traffic load.

The signalling method according to the invention is particularly advantageous in a system where the length of a transmission time slot of a base station can be varied in accordance with the amount of signalling passing through the base station. The transmission time slot may also be extended due to repeated transmission caused by a transfer error and when an (immediate) acknowledgement to a transmitted message is required from a mobile radio. The decision on the length of the transmission time slot is preferably made during the respective time slot. The length of the transmission time slot is controlled by a time slot extension algorithm having a probability function which decreases with increasing length of the time slot. Base stations which usually have a higher traffic density (e.g. densely populated areas) may be allotted more transmission time by defining minimum and maximum values for the different base stations.

BRIEF DESCRIPTION OF THE DRAWINGS

In the following, the invention will be described in more detail by means of an illustrating embodiment with reference to the attached drawings, in which.

DETAILED DESCRIPTION OF A PREFERRED EMBODIMENT OF THE INVENTION

Figure 1:
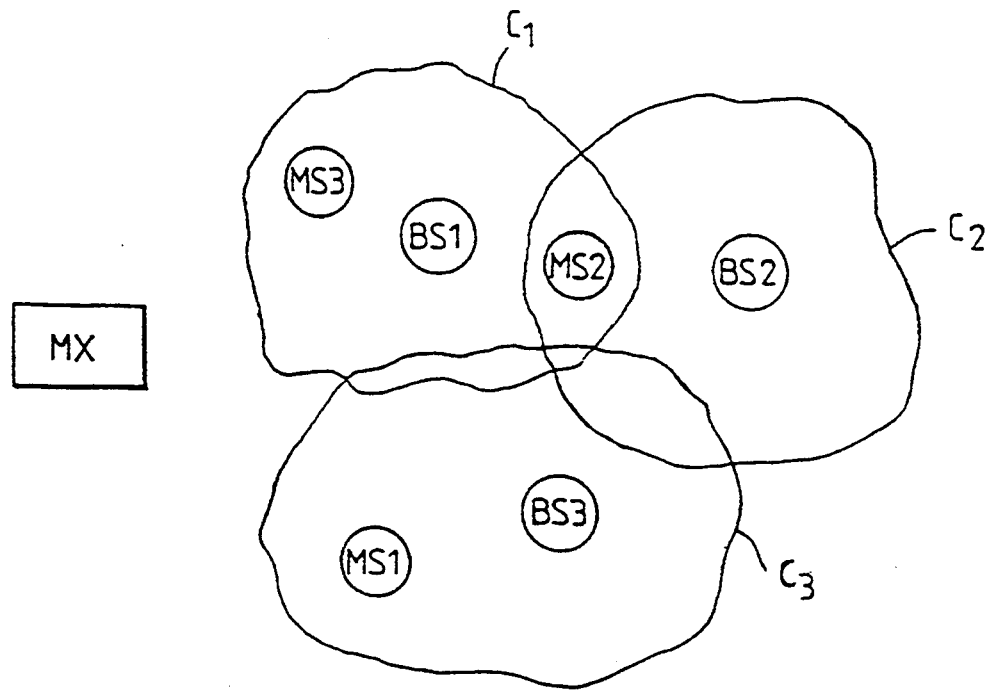
FIG. 1 illustrates a radio system in which the invention can be applied.

FIG. 1 shows a mobile radio system in which the geographical area covered by the system is divided into smaller radio areas or radio cells C1, C2 and C3 so that adjacent cells preferably overlap. Certain frequency channels are assigned to the cells for call connections so that at least nearby cells do not use the same frequencies simultaneously. Each cell C1, C2 and C3 comprises at least one fixed multi-channel transceiver equipment BS1, BS2 and BS3, called a base station herein. All of the base stations BS1, BS2 and BS3 are connected by fixed links, such as cables, to a mobile radio exchange MX, which thus controls several base stations BS.

Predetermined radio frequencies or radio channels are assigned to the radio system for speech or data connections. The base stations BS establish a radio link over the radio channels with remote radio stations or mobile radios MS roaming in the cells. The mobile radio exchange MX allocates these radio channels to the base stations separately for each call on the dynamic allocation principle so that the same frequencies are not used simultaneously at adjacent base stations which could interfere with each other.

Figure 2:
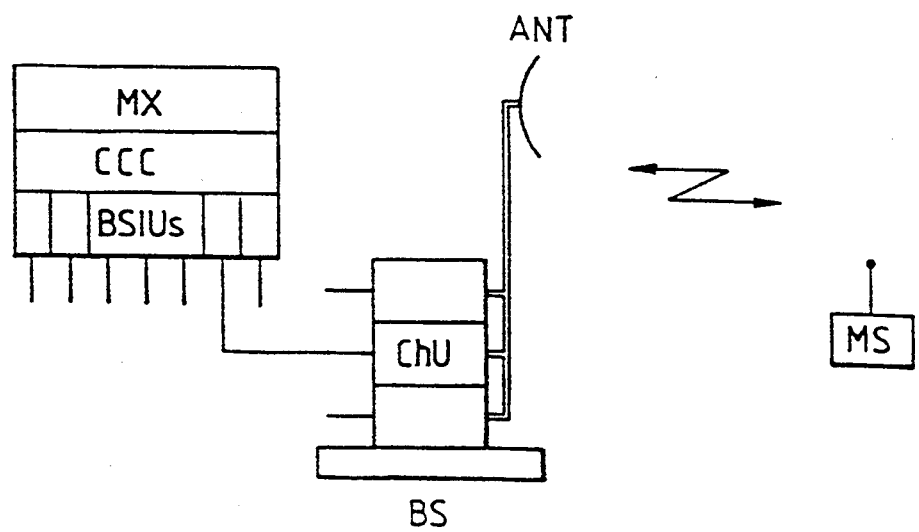
FIG. 2 illustrates an interconnection between a mobile radio exchange and a base station.

FIG. 2 illustrates the interconnection between the mobile radio exchange MX and the base station BS. The mobile radio exchange MX contains several base station interface units BSIU, each one of which serves as a link between a call control computer CCC and a base station radio channel unit ChU. Each base station BS has several radio channel units ChU each comprising a radio transceiver. The CCC allocates free radio channels, radio channel units ChU and base station interface units BSIU to each call in which one or more remote mobile stations MS controlled by the exchange MX participate. For each call the mobile radio exchange MX can force the channel unit ChU to operate on a certain desired radio channel to realize the above-mentioned dynamic allocation.

The BSIU has four primary functions: to control the access to the radio channel assigned to it; to convert and forward messages between the radio units or channel units ChU and the CCC; to switch the speech paths of the exchange to the radio channel; and to control and monitor the operation of the base station. One BSIU controls one channel, which may be either a traffic channel or a control channel (call channel) used by the system for control signalling, such as call set-up signalling. In both cases, the BSIU receives messages from the CCC; monitors the 4-wire speech and signalling connection between the exchange and the base station; and transmits control data to the CCC concerning the condition of the transmitter, the base station and the transmission lines.

When the BSIU is connected to the traffic channel, it is either in an idle state or in a call state. In the idle state, the BSIU awaits an allocation message from the CCC and monitors the transmission line to the base station BS. When the BSIU is allocated to a call, it starts the transmitter of the base station BS and switches the speech paths between the base station BS and the exchange in accordance with the call type. During the call the BSIU transmits and receives call control messages and monitors the call maintenance and releases the call in accordance with the carrier data, the call control messages from the radio path and the control from the CCC.

In the control channel mode, the BSIU may operate as a dedicated control channel, an undedicated control channel or a time-shared control channel. The invention is applied in a case where several base stations BS1, BS2 and BS3 share a common frequency channel, which they use sequentially on a time-shared basis for the transmission of their control messages. One of the above-mentioned BSIUs is permanently dedicated at each base station to the time-shared control channel. This dedicated BSIU will be called TSCCIU (time shared control channel interface unit) below.

The system may comprise several base station groups each having a dedicated control channel. The transmission sequence starts with the transmission of a predetermined base station and ends with a break before it restarts with the transmission of the same base station. In the preferred embodiment of the invention, the control signals or bursts transmitted on the control channel comply with the MPT 1327 standard issued by the British Department of Trade and Industry. Each burst is preceded by a break during which no BS is transmitting on the control channel. Each burst contains a frame starting with the fields LET, PREAMBLE and SYNC, as described in MPT 1327, chapter 3.3.3.1. Each burst is also provided with the identity of the transmitting base station.

One or more radio transceivers or mobile radios MS1, MS2 and MS3 roam freely within the area of the mobile radio system. Each mobile radio or remote station MS registers to one of the base stations when it resides within the area of the system. In this way the system keeps record of the rough location of the mobile radios MS for call set-up purposes. On moving to another cell C the mobile radio has to register to the base station BS of the cell. The mobile radio MS is considered to be active in the cell C when it has selected the cell in compliance with a certain procedure, the base station BS of the cell has transmitted a burst and the mobile radio MS has received the identity of the base station.

The mobile radio MS is able to transmit signalling messages only when the base station BS of the cell where the mobile radio is active transmits simultaneously on the control channel. The mobile radio MS may transmit signalling messages such as acknowledgements to the messages of the base station BS, and random access messages allowed only after the MS has received an ALOHA message from the base station BS. The length of each individual burst on the control channel within the transmission time slot of the base station BS can be varied dynamically between the minimum and maximum values allotted to the respective base station BS in accordance with the number of the inbound and outbound messages of the respective base station BS. The total duration of the burst sequence may thus also vary.

On a time-shared control channels the signalling load may vary significantly from one base station to another. For this reason it is necessary to allow a base station with a heavy traffic load to use more control channel capacity in order to maintain the call set-up time tolerable. In one embodiment of the invention, this is accomplished by allowing the base station to extend its signalling burst during peak load. The maximum length of the burst has to be controlled so that the total burst sequence is maintained within specified limits.

The signalling method according to the invention aims at maintaining the time required for the call set-up to be as short as possible even during high traffic load. Accordingly, the basic rule is that any unfinished message transactions associated with the call set-up to be or any signalling transactions initiated during the preceding burst of the base station are always completed first in the next burst of the same base station.

Otherwise the TSCCIU arranges the queuing messages from the CCC into five different priority groups.

Group 1. CCC messages to the mobile radios which require an acknowledgement from the mobile radios and are short and the most critical to the call set-up are always transmitted next in the burst. In other words, these messages are always transmitted before the ALOHA message allowing the mobile radios to transmit random access messages, i.e. before the frame generation. This group includes the following messages: Obtainable Check (AHY(check=1)) complying with MPT 1327, Availability Check (AHY(check=0), B-release (AHYX), Status (AHYQ), Registration Request (ALHR) and Security Code Request (AHYC).

Group 2. CCC messages to the mobile radios which require no acknowledgement are transmitted in empty waiting time slots while the TSCCIU executes a signalling transaction requiring an acknowledgement from the mobile radio (the messages of Group 1). If there are no signalling transactions requiring an acknowledgement from the mobile radios, the TSCCIU generates a frame for the messages and transmits the messages in the frame. This group includes the following MPT 1327 compatible messages: Channel (GTC), Acknowledgement (ACK, -I, -X, -V, -B, -Q, -T) and Move (MOVE, which does not terminate operation on the respective channel).

Group 3. This group contains the MPT 1327 compatible messages Short Data (HEADDATA) and Extended Data (HEADDATA HEADDATA).

Group 4. This group contains the MPT 1327 compatible message Move (MOVE), which terminates operation on the respective channel.

Group 5. This group contains the following MPT 1327 compatible messages (BCAST): Adjacent Sites, Announce Channels, Maintenance Parameters and Registration Parameters.

If the messages queuing at the TSCCIU include no Group 2 messages, the TSCCIU transmits BCAST (Group 5) and ALH(O) messages alternately in empty time slots.

The probability that a random access frame will be generated in the burst is increased by incrementing the sum (S) of the weighing coefficients of the message queue if a collision has been detected in the preceding frame. Any mobile radio is allowed to use the time slots in the random access frame for transmitting random access messages after an inbound mobile radio signalling transaction that requires extended addressing.

One signalling sequence corresponds to one signalling transaction. If the transaction is initiated by a mobile radio, it also contains repetitions transmitted by the CCC. If the transaction is started by the CCC, it does not contain repetitions, i.e. a repetition is a new signalling transaction.

From the viewpoint of the mobile radio MS, the above-mentioned control channel signalling and measuring procedures naturally take place only when the mobile radio has no speech connection and listens to the control channel.

The drawings and the description related to them are only intended to illustrate the present invention, In its details, the radio system according to the invention may vary within the scope of the attached claims.

We claim:

1. A signalling method for a radio system having a plurality of fixed radio stations and at least one remote radio station, these fixed radio stations time-sharing a control channel for transmitting temporally successive messages, each remote radio station being arranged to receive and be controlled by respective of said messages as transmitted by respective of said fixed radio stations, including:
    establishing and operating a pattern of time-sharing of said control channel by said fixed radio stations, according to which each of said fixed radio stations has use of said control channel temporally successively allocated to it for respective time slots temporally interspersed with allocation thereof to others of said fixed radio stations, for transmission of messages;
    upon occurrence of message queuing at any one of said fixed radio stations of such magnitude that all of the messages awaiting being sent in a time slot next available to that fixed radio station would, if sent, take more time than a predetermined amount of time which is related to a nominal expected duration for said time slot, automatically arranging to send said messages in a predetermined order, to the extent any of said messages can be sent within said time slot, said predetermined order being one in which:
    (a) first in priority are sent any messages of unfinished call set-up transactions initiated in a respective time slot allocated to said fixed radio station preceding said time slot;
    (b) next in priority are sent any messages critical to a call set-up transaction and requiring an acknowledgement from a respective said remote station; and
    (c) lowest in priority are sent any messages requiring no acknowledgement from a respective said remote station.

2. The method of claim 1, further including:
each said remote radio station is capable of transmitting an in-bound message to a respective one of said fixed radio station is only during a said time slot allocated to that fixed radio station; and
as part of operating said pattern of time-sharing, sensing numbers of messages awaiting being sent by each of said fixed radio stations, and numbers of in-bound messages awaiting being sent to respective ones of said fixed radio stations by each said remote radio station in respective next time slots; and, in response to such sensing, dynamically lengthening and shortening respective ones of said time slots between a predetermined maximum time interval and a predetermined minimum time interval allowable to each respective fixed radio station as its respective next time slot.

3. The method of claim 1, wherein:
within at least some of the time slots within which messages having said first priority or said next priority are being sent, such messages are each sent as a respective burst temporally adjoined by a respective empty time slot segment while awaiting a respective acknowledgement from a respective said remote radio station; and
at least some of said lowest in priority messages are sent during said empty time slot segments.

4. The method of claim 3, wherein:
within at least some of the time slots within which messages having said first priority or said next priority are being sent, such messages are each sent as a respective burst temporally adjoined by a respective empty time slot segment while awaiting a respective at least one random access message from a respective remote radio station; and
at least some of said lowest in priority messages are sent during said empty time slot segments.

* * * * *